United States Patent [19]

Brule

[11] Patent Number: 5,765,733
[45] Date of Patent: Jun. 16, 1998

[54] CONVERTIBLE PACK FOR CYCLING AND BACKPACKING

[76] Inventor: Philip James Brule, 1385 Klock Road, Aylmer, Quebec, Canada, J9H 5E1

[21] Appl. No.: 641,787

[22] Filed: May 2, 1996

[30] Foreign Application Priority Data

May 3, 1995 [CA] Canada ................................. 2147029

[51] Int. Cl.$^6$ ....................................... A45F 4/02
[52] U.S. Cl. ................................. 224/153; 224/417
[58] Field of Search ........................ 224/153, 417, 224/31

[56] References Cited

U.S. PATENT DOCUMENTS

| 3,786,972 | 1/1974 | Alley | 224/417 |
| 4,248,367 | 2/1981 | Buel | 224/153 |
| 4,491,258 | 1/1985 | Jones | 224/153 |

FOREIGN PATENT DOCUMENTS

| 2676627 | 11/1992 | France | 224/153 |

OTHER PUBLICATIONS

Trek Pak packaging, Jul. 19, 1976.

*Primary Examiner*—Renee S. Luebke
*Attorney, Agent, or Firm*—William B. Vass

[57] ABSTRACT

A pack convertible to a pannier for bicycling and a backpack for hiking. The pack comprises a multiple compartment travel bag. The compartments are attached to a hinged back member. The pack includes a pair of shoulder straps and a waist belt for carrying the pack as a backpack and fastening straps for converting the pack to a backpack. In pannier mode, the hinged back member allows the compartments to attach to each side of a pannier rack and the fastening straps are connected to the shoulder straps to secure the straps out of the way. To convert to a backpack, the fastening straps are cinched together to straighten the back member. When converted to a backpack, the back member forms an internal frame to assist in supporting the load carried by the hiker\cyclist.

10 Claims, 4 Drawing Sheets

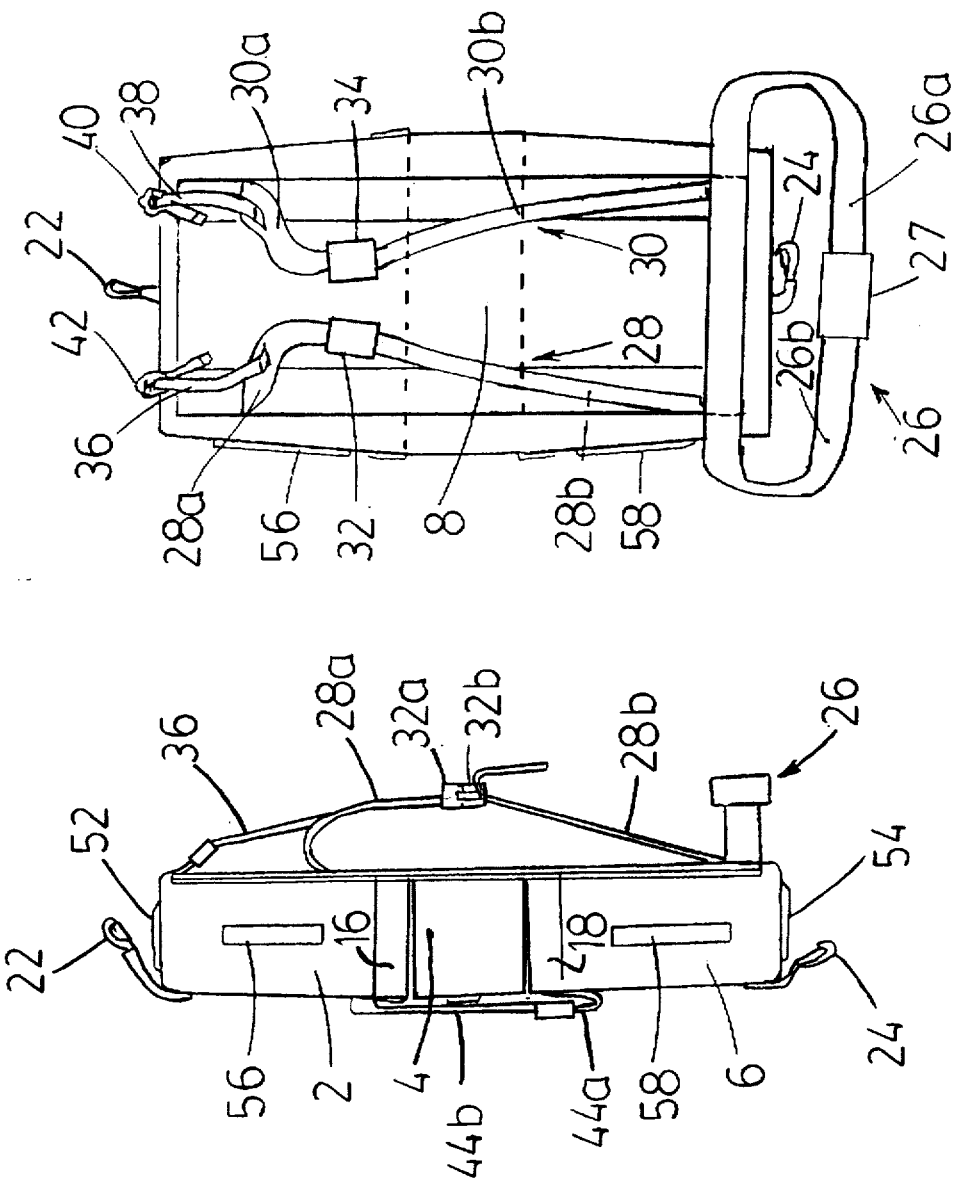

CONVERTIBLE PACK FOR CYCLING AND BACKPACKING

FIELD OF THE INVENTION

The present invention relates to travel bags, and more particularly to a pack convertible between a pannier for cycling and a pack for backpacking, hiking and the like.

BACKGROUND OF THE INVENTION

Bicycle touring and adventure cycling have become popular pastimes. Standard equipment for such cycling includes pannier bags for providing storage for rain-gear, camping equipment and other supplies. The pannier bags attach to racks (front and/or rear) which are mounted on the frame of the bicycle. Pannier bags are also commonly used by an ever-increasing number of bicycle commuters and the number of two-wheeled commuters is growing in major urban centers.

The nature of bicycle touring and adventure cycling often mean travelling to foreign countries with luggage and bicycle in tow. For most air and rail travel, there are baggage restrictions and it is necessary to detach the pannier bags from the bicycle racks. In a pinch pannier bags can double as travel or luggage bags. Unfortunately, known pannier bags are designed to be carried attached to racks on a bicycle and not as luggage by a traveller moving through busy airport terminals or rail stations.

Alley in U.S. Pat. No. 3,786,972 attempts to address this problem. U.S. Pat. No. 3,786,972 issued Jan. 22, 1974 and discloses a combination pannier bag, valise and backpack. The combination pack taught by Alley comprises two compartmented bags with each bag having a three-hook harness assembly. According to Alley his harness assembly is an improvement over existing fasteners and in addition provides the capability to convert the pack. In pannier mode each bag is attached to a side of the rack. To convert the compartmented bags to a valise, the harness assembly is fastened to the harness assembly of the other bag to form a unitary satchel from the two bags. In another aspect, the harness assembly taught by Alley allows the compartmented bags to be attached singly or in a superimposed stacked relation to a conventional tubular pack frame to form a backpack.

While Alley provides a pannier bag assembly which is convertible to a unitary satchel, the Alley invention is less than satisfactory as a backpack. The arrangement taught by Alley requires an external tubular pack frame to convert the pannier bags into a backpack. This means that in addition to the bicycle, pannier bags and other gear, the cyclist must also carry a tubular pack frame in order to be able use the pannier bags as a backpack. It will be appreciated that carrying a tubular pack frame is clearly undesirable. The undesirability of this arrangement is further exemplified by the bulky nature of a tubular pack frame.

Accordingly, there remains a need in the art for a pannier bag assembly which is easily convertible to a backpack without the need for an external tubular pack frame or the like.

BRIEF SUMMARY OF THE INVENTION

The present invention provides a pack convertible between a pannier for cycling and a backpack for hiking.

In one aspect, the present invention provides a convertible pack suitable for attaching to a pannier rack mounted on a bicycle and convertible to a pack for backpacking, the pack comprises: (a) a backing member comprising a plurality of sections and each section having means for holding a storage compartment; (b) backpack converting means for converting the pack into a backpack, the backpack converting means includes, (i) at least one hinge connecting adjacent sections in the backing member and allowing the adjacent sections to swing relative each other; (ii) securing means for securing the hinges in a closed position; (iii) strap means for forming carrying straps for using the pack in backpack mode; (c) pannier converting means for converting the pack into a pannier for use with the bicycle, the pannier converting means including, (iv) fastening means for fastening the pack to the pannier rack and the fastening means maintaining the adjacent sections at an angle suitable for mounting the pack on the pannier rack; and (v) the securing means including coupling means for coupling to the strap means so that the strap means are held in a storage position.

BRIEF DESCRIPTION OF THE DRAWINGS

Reference will now be made, by way of example, to the accompanying drawings which show preferred embodiments of the present invention, and in which:

FIG. 4 is a side view of the convertible pack of FIG. 1 configured as a backpack according to the present invention;

FIG. 5 is a front view of the convertible pack of FIG. 5;

DETAILED DESCRIPTION OF THE PREFERRED EMBODIMENTS

Figure 1:
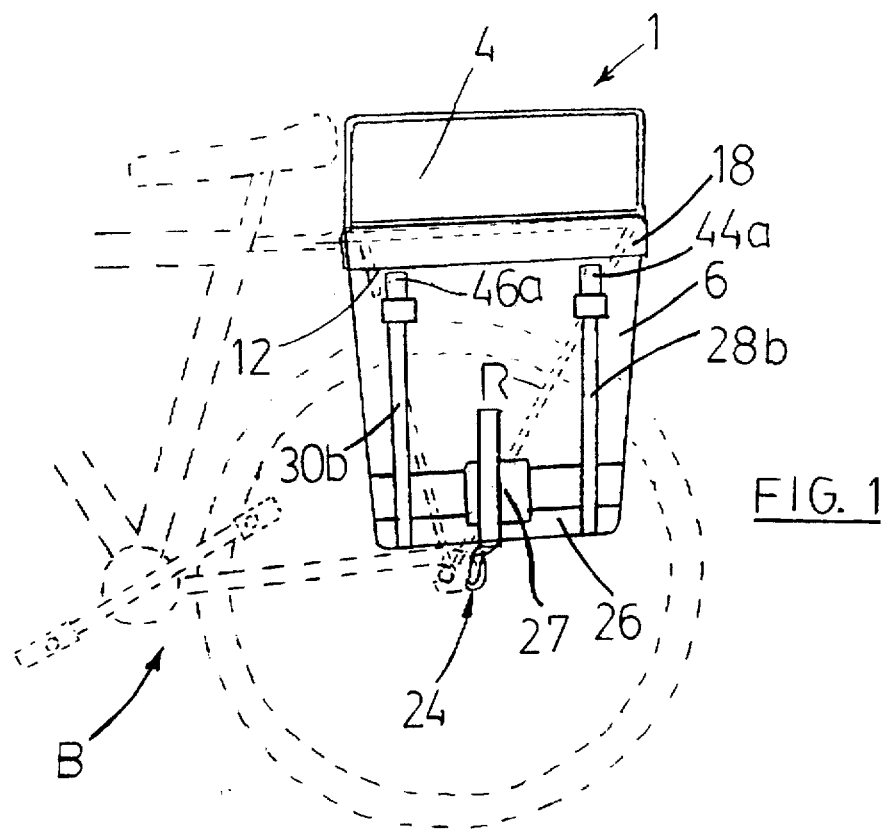
FIG. 1 is a side view of a convertible pack according to the present invention mounted on a luggage rack attached to a bicycle with the bicycle being shown in broken line or phantom outline.
Figure 2:
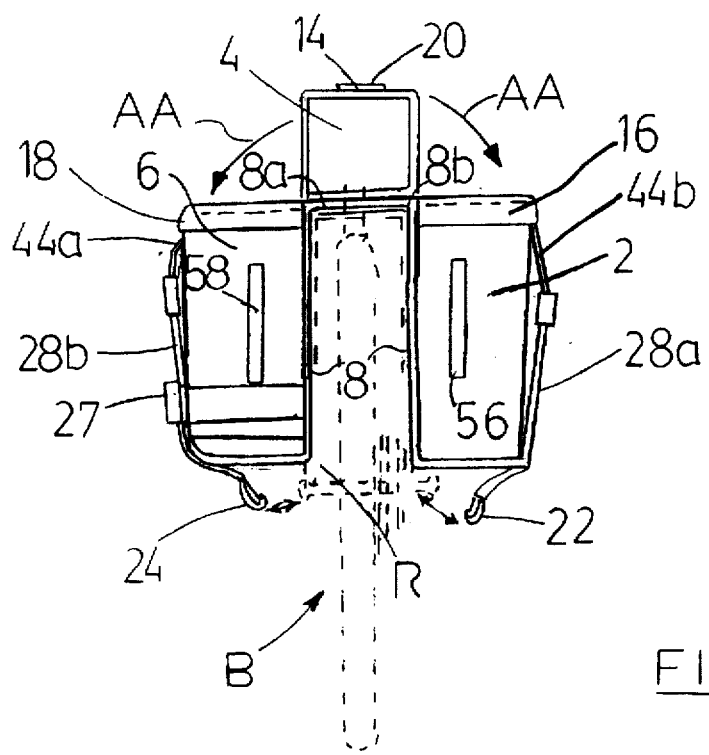
FIG. 2 is a rear view of the convertible pack of FIG. 1.

Reference is first made to FIGS. 1 to 6 which show a preferred embodiment of a convertible pack according to the present invention and indicated generally by reference 1. The pack 1 according to the present invention is convertible between a pannier assembly (i.e. pannier mode) suitable for bicycle touring and a pack-sack (i.e. backpack mode) for hiking. The convertible pack 1 is shown in FIGS. 1 and 2 attached to a bicycle indicated by reference B and depicted in phantom or broken outline. The bicycle B includes a pannier rack denoted by reference R. The pannier rack R is of conventional design. In FIGS. 4 and 5, the pack 1 is shown converted for use as a backpack.

Figure 3:
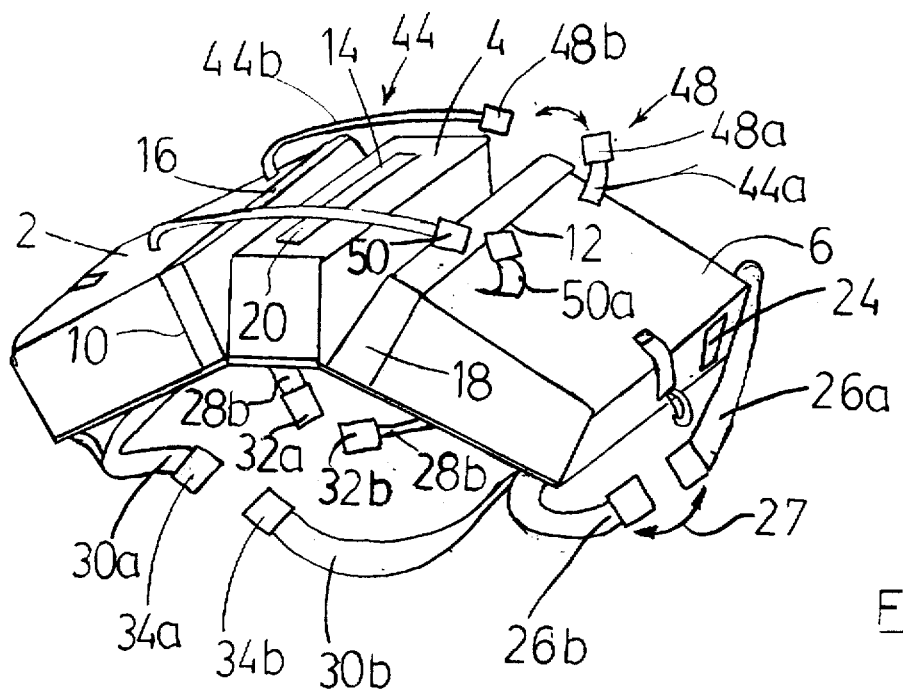
FIG. 3 is a diagrammatic view of the convertible pack removed from the luggage rack on the bicycle.

As shown in FIGS. 2 and 3, the convertible pack 1 has three compartments denoted by references 2, 4 and 6, respectively. The compartments 2, 4, 6 are attached to a back member 8. The compartments 2, 4, 6 may include internal dividers and pockets for organizing the hiker\cyclists gear and supplies.

In pannier mode, the convertible pack 1 is attached to the rack R of the bicycle B as shown in FIGS. 1 and 2. The two compartments 2, 6 hang over respective sides of the pannier rack R, and the third compartment 4 sits on top of the pannier rack R. Each of the compartments 2, 4, 6 includes at least one zipper, indicated by references 10, 12 and 14 respectively, for accessing the compartments. To keep the weather out, preferably, the zippers 10, 12, 14 include a flap indicated by references 16, 18, and 20 respectively. The convertible pack 1 has clips 22, 24 for securing the pack 1 to the pannier rack R.

Figure 6:
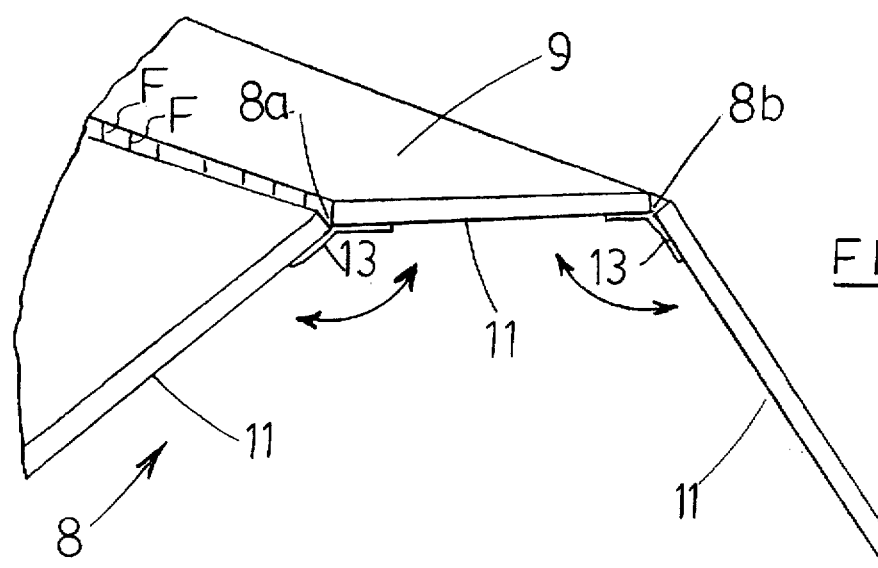
FIG. 6 is a partial view of a hinge for the convertible pack of FIG. 1.

The back member 8 has two hinge portions 8a, 8b as shown in FIGS. 2 and 6. In pannier mode, the hinges 8a, 8b are in an open position and the back member 8 takes the shape of an inverted "U-shape" as shown in FIG. 2. In backpack mode, the hinges 8a, 8b are in closed position and the back member 8 is substantially planar as shown in FIG. 4.

The back member 8 performs a dual function of supporting the compartments 2, 4, 6 and in backpack mode, the back member 8 forms an internal frame for the pack 1. It is a feature of the present invention, that the internal frame formed by the back member 8 is an integral component of the pack 1 thereby eliminating the need to carry a separate tubular frame as taught by the prior art. Advantageously, an internal frame provides a closer fit than an external frame thereby making the pack 1 suitable for rigorous hiking and light-mountaineering without sacrificing load capacity.

The convertible pack 1 includes a number of straps to convert between pannier mode and backpack mode. Referring to FIG. 3, the pack 1 includes a waist belt 26, and a pair of shoulder straps 28, 30 which are attached to the back member 8. As shown in FIG. 5., the shoulder strap 28 comprises two sections, a wider upper strap 28a and a lower strap 28b. The wider upper strap 28a may include detachable padding (not shown). The shoulder strap 28 includes a releasable clasp assembly 32 for coupling the upper and lower straps 28a, 28b together. The releasable clasp 32 comprises compatible female and male connectors 32a and 32b. Preferably, the clasp assembly 32 permits the length of the shoulder strap 28 to be adjusted. Similarly, the other shoulder strap 30 has upper and lower straps 30a, 30b and a releasable clasp 34.

Optionally, the shoulder straps 28, 30 may include additional adjustment straps 36, 38 for adjusting the height of the respective shoulder straps 28, 30 (as shown in FIG. 5) and thereby the height of the pack 1 on the hiker's back. Each of the adjustment straps 28, 30 includes a conventional adjustable buckle or clasp 40, 42. Referring to FIGS. 4 and 5, the adjustment strap 36 is fastened to the (top) compartment 2 and the upper strap section 28a of the shoulder strap 28. The other adjustment strap 38 is similarly configured.

As shown in FIG. 3, the waist belt 26 comprises two sections 26a, 26b and a quick release buckle 27 of conventional type. The buckle 27 preferably allows the length of the belt section 26b to be adjusted to comfortably fit the waist of the hiker\cyclist. Preferably, the waist belt 26 is padded and sized to allow the load carried in the pack 1 to be transferred from the shoulder straps 28, 30 to the waist belt for efficient carriage of a fully-loaded pack for extended trekking. Optionally, the waist belt 26 may include detachable padding (not shown).

Referring to FIG. 3, the convertible pack 1 also includes a pair of fastening straps 44 and 46 which are attached to the outside surface of the compartments 2 and 6. The fastening strap 44 comprises two sections 44a and 44b. The sections 44a, 44b are coupled together by a buckle or clasp 48 comprising a female connector 48a and a male connector 48b. The male connector 48b allows the strap section 44b to be tightened and loosened. The buckle 48 is compatible with the buckle 32 of the shoulder strap 28. Preferably, the buckle 48 is of the quick-release type. Similarly, the other fastening strap 46 comprises two sections 46a, 46b, and a buckle 50 comprising a female connector 50a and a male connector 50b. The buckle 50 is also compatible with the buckle 34 on the shoulder strap 30.

In backpack mode, the respective sections of the fastening straps 44 and 46 are clasped together (FIG. 3). The compartments 2, 4, 6 are cinched together by tightening the respective sections 46a, 48a of the fastening straps 46, 48. The tightening of the fastening straps 44, 46 pulls adjacent compartments 2 and 4, and adjacent compartments 4 and 6 against each other. The tightening of the fastening straps 44, 46 also straightens the back member 8 as shown in FIG. 4. The tension in the fastening straps 44, 46 keeps the hinges 8a, 8b (FIG. 6) in a closed position. In another aspect, the tension in the fastening straps 44, 46 may be varied to provide a curvature in the back member 8. Some backpackers will prefer the contoured fit of a curved back member 8.

In pannier mode, the fastening straps 44, 46 are unclasped and coupled instead to the shoulder straps 28, 30. As shown in FIG. 2, the upper section 28a of the shoulder strap 28 is looped around to the outside of compartment 2 and coupled to the section 44b of the fastening strap 44, i.e. the female connector 32a is clasped with the male connector 48b. The lower section 28b of the shoulder strap 28 is looped around to the outside of compartment 6 and coupled to the section 44a of the fastening strap 44, i.e. the male connector 32b is clasped with the female connector 48a of the fastening strap 44. Similarly, the fastening strap 46 is coupled to the other shoulder strap 30.

As shown in FIG. 2, the waist belt 26 is looped around the outside of compartment 6. The buckle 27 is clasped to secure the belt 26 around the compartment 6. To further minimize movement of the shoulder straps 28a, 28b, the compartments 2 and 6 may include a hook and loop fastener strip, such as the known VELCRO™ type fastener denoted by references 52 and 54, as shown in FIG. 4. The shoulder straps 28, 30 include complementary hook and loop fastener strips which engage the strips 52 and 54 when the shoulder straps 28, 30 are looped around the compartments 2 and 6 in pannier mode as shown in FIG. 2.

Preferably, the compartments 2 and 6 include reflectors 56 and 58 as shown in FIGS. 2 and 4. The reflectors 56 and 58 increase the visibility of the cyclist particularly at night when the pack 1 is mounted as a pannier on the bicycle B. Optionally, the pack 1 may include a flap which is zippered over the back member 8 to cover the shoulder straps 28, 30 and the waist belt 26.

The compartments 2, 4, 6 are constructed from suitable materials, for example, rugged nylon such as cordura, using conventional assembly methods. The back member 8 is preferably formed from a stiffened piece of plastic or composite material. The back member 8 may be formed from corrugated a plastic sheet with corrugations or webs F. The hinge 8a, 8b is formed by cutting into the top layer 9 of the corrugated plastic sheet and bending about the bottom layer 11 of the plastic sheet which shears the corrugations or webs F as the plastic sheet is bent. To reinforce the hinges 8a, 8b, a flexible sheet 13 is laminated to the bottom layer 11 about the area of the hinges 8a, 8b. It will be appreciated that the hinges 8a, 8b may be constructed using other techniques, for example, including hinged aluminum sections.

Figure 7:
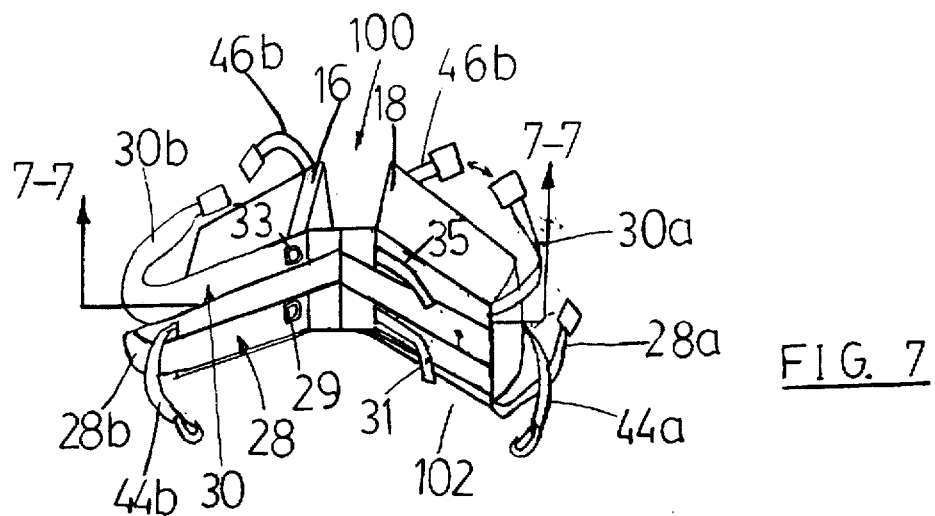
FIG. 7 is a diagrammatic view of another embodiment of the convertible pack according to the present invention.

Reference is next made to FIG. 7 which shows another embodiment of a convertible pack according to the present invention. The convertible pack is denoted generally by reference 100. The convertible pack 100 is a two compartment version of the pack 1 described above. Like reference numerals indicate like elements in FIGS. 1–6 and FIGS. 7–8.

Figure 8:
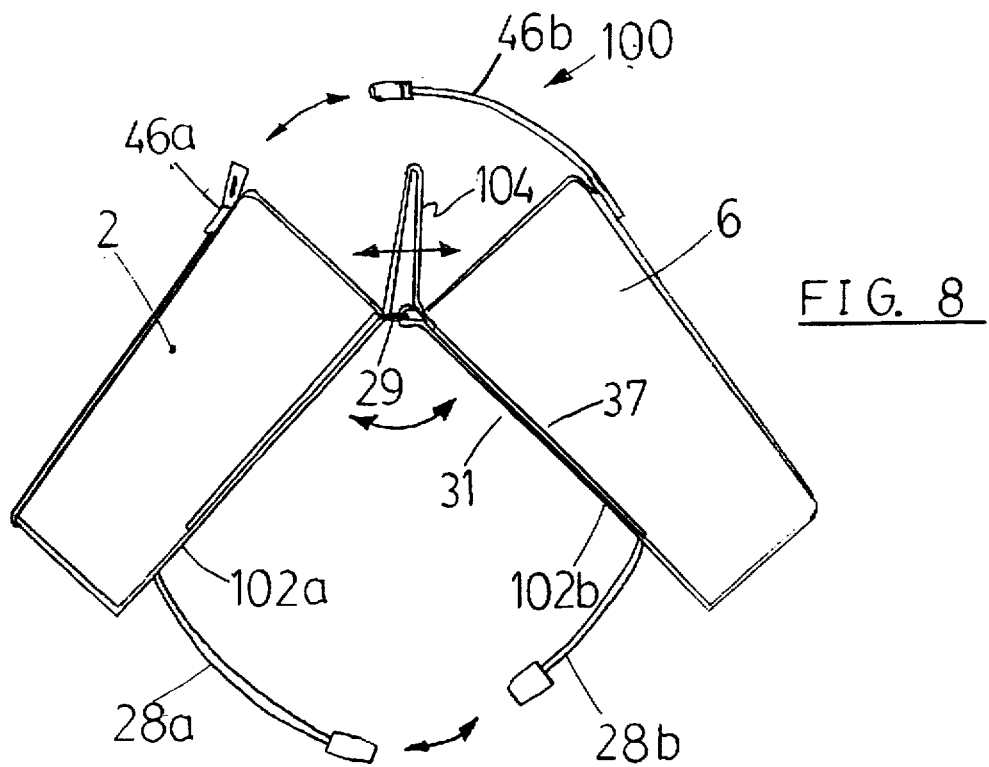
FIG. 8 is a sectional view of the convertible pack of FIG. 7 taken along line 7—7.

As shown in FIGS. 7 and 8, the pack 100 has two compartments 2, 6 and does not include the third compartment 4 (FIG. 3). The pack 100 has a smaller capacity and is particularly suited for a rack (not shown) mounted over the front wheel of the bicycle B or alternatively for shorter trips or urban commuting. Because of the smaller capacity, the waist strap 26 (FIG. 3) is optional and not included on the pack 100 shown in FIG. 7.

Referring to FIG. 7, the convertible pack 100 includes a pair of fastening straps 44, 46 and a pair of shoulder straps 28, 30. The shoulder straps 28, 30 are attached to a modified back member denoted by reference 102. The back member 102 comprises first and second sections 102a, 102b formed from a stiffened plastic material or a reinforced padded material. A web 104 connects the back member sections 102a, 102b. The shoulder straps 28, 30 are attached, for example sewn, to the web 104. As shown in FIG. 7, attached to the shoulder strap 28 are a D-ring 29 and a strap 31 with a hook and fastener strip. Similarly, attached to the other shoulder strap 30 are a D-ring 33 and a strap 35 also with a velcro strip.

In pannier mode, the pack 100 is draped across the rack R and the web 104 opens flat across the top of the rack R and provides support for the compartments 2 and 6. The compartments 2, 6 and back member sections 102a, 102b hang on either side of the rack R (FIG. 1). To convert the pack 100 into a backpack, the strap 31 is looped through the D-ring 29 and cinched tight to pull together the back member sections 102a, 102b as shown in FIG. 8. The strap 31 is held in position by a complementary hook and loop fastener strip 37 attached to the back member section 102b. Similarly, the other strap 35 is looped through the D-ring 33, cinched tight and held in position by another complementary hook and loop fastener strip. The fastening straps 44 and 46 are also tightened as described above. By pulling and cinching the straps 31, 35 and the fastening straps 44, 46, the back member 102 is straightened and the compartments are pulled together to convert the pack 1 for backpack use.

In a variation of the pack 100, the D-rings 29, 33 and the hook and loop fastener straps 31, 35 are replaced by an expandable and flexible hinge member which connects the two sections 102a, 102b of the back member 102. The pack 100 also includes a web 104. The flexible hinge member may suitably be made from an elasticized material.

In pannier mode, the pack 100 is draped across the rack R and the hinge member expands so that the compartments 2 and 6 hang on either side of the rack R (FIG. 1). The web 104 opens flat across the top of the rack R and provides support for the compartments 2 and 6. In backpack mode, the fastening straps 44, 46 are snapped together at the respective buckles 48, 50 as described above. The fastening straps 44, 46 are cinched tight to pull the compartments 2 and 6 together, and the web 104 is sandwiched between the compartments 2 and 6. The sections 102a, 102b of the back member 102 are straightened out to form an internal frame for providing support to the hiker\bicycle commuter.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

I claim:

1. A convertible pack suitable for attaching to a pannier rack mounted on a bicycle and convertible to a pack for backpacking, said pack comprising:
   (a) a backing member comprising a plurality of sections and each section having means for holding a storage compartment;
   (b) backpack converting means for converting said pack into a backpack, said backpack converting means including,
      (i) at least one hinge connecting adjacent sections in said backing and allowing said adjacent sections to swing relative each other;
      (ii) securing means for securing said hinges in a closed position;
      (iii) strap means for forming carrying straps for using said pack in backpack mode;
   (c) pannier converting means for converting said pack into a pannier for use with the bicycle, said pannier converting means including,
      (iv) fastening means for fastening said pack to the pannier rack and said fastening means maintaining said adjacent sections at an angle suitable for mounting said pack on the pannier rack; and
      (v) said securing means including coupling means for coupling to said strap means so that said strap means are held in a storage position.

2. The convertible pack as claimed in claim 1, wherein said securing means comprise a strap having a first portion anchored to one of said sections on said backing member and a second portion anchored to another of said sections on said backing member and a clasp for connecting said first and second portions for converting said pack into a backpack.

3. The convertible pack as claimed in claim 2, wherein said backing member comprises three sections each having a storage compartment, so that said pack provides a three compartment pannier.

4. The convertible pack as claimed in claim 3, wherein said fastening means comprises a clip.

5. The convertible pack as claimed in claim 4, wherein said coupling means comprises a clasp compatible with a corresponding clasp on said strap means.

6. The convertible pack as claimed in claim 2, wherein said backing member comprises three sections, and said sections adjacent a middle section each having a storage compartment, so that said pack provides a two compartment pannier.

7. A convertible pack suitable for attaching to a pannier rack mounted on a bicycle and convertible to a pack for backpacking, said pack comprising:
   (a) a backing member comprising a plurality of sections and each section having means for holding a storage compartment;
   (b) backpack converting means for converting said pack into a backpack, said backpack converting means including,
      (i) at least one hinge connecting adjacent sections in said backing member and allowing said adjacent sections to swing relative each other;
      (ii) fastening straps for securing said backing member in a substantially planar position;
      (iii) a pair of shoulder straps for carrying said pack in backpack mode;
   (c) pannier converting means for converting said pack into a pannier for use on the bicycle, said pannier converting means including, (iv) fastening clips for fastening said pack to the pannier rack and said fastening clips maintaining said adjacent sections at an angle suitable for mounting said pack on the pannier rack; and (v) said fastening straps having buckles compatible with buckles on said shoulder straps for coupling said shoulder straps so that said shoulder straps are held in a storage position.

8. The convertible pack as claimed in claim 7, wherein said backing member comprises two sections.

9. The convertible pack as claimed in claim 8, wherein said hinge comprises a flexible member.

10. The convertible pack as claimed in claim 9, further including a waist belt for use in backpack mode.

* * * * *